A. F. & H. C. JOHNSON.
FEEDER FOR THRESHING MACHINES.
APPLICATION FILED JULY 21, 1908.
940,026.
Patented Nov. 16, 1909.
2 SHEETS—SHEET 1.
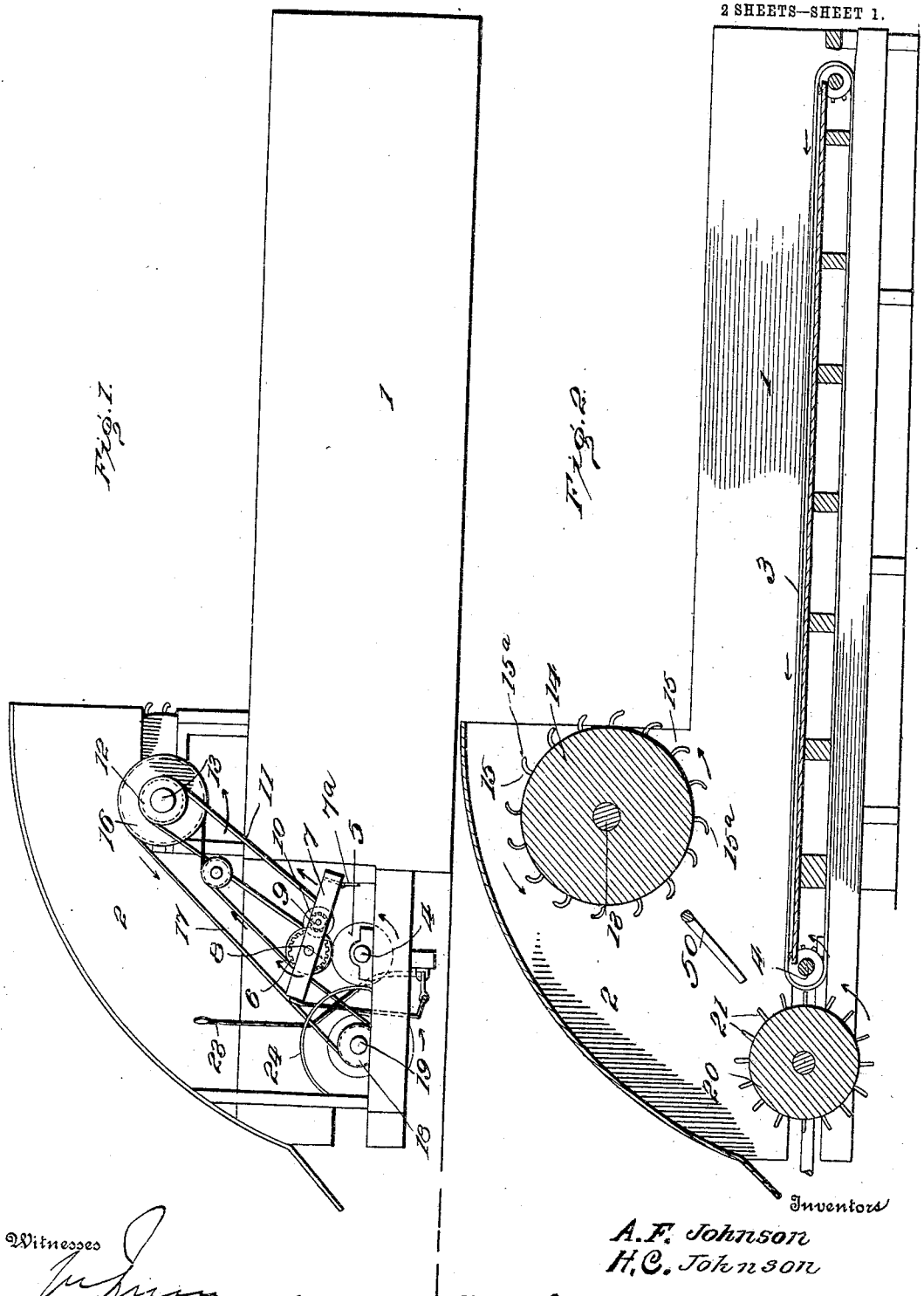
Witnesses
Inventors
A. F. Johnson
H. C. Johnson
By
Attorneys

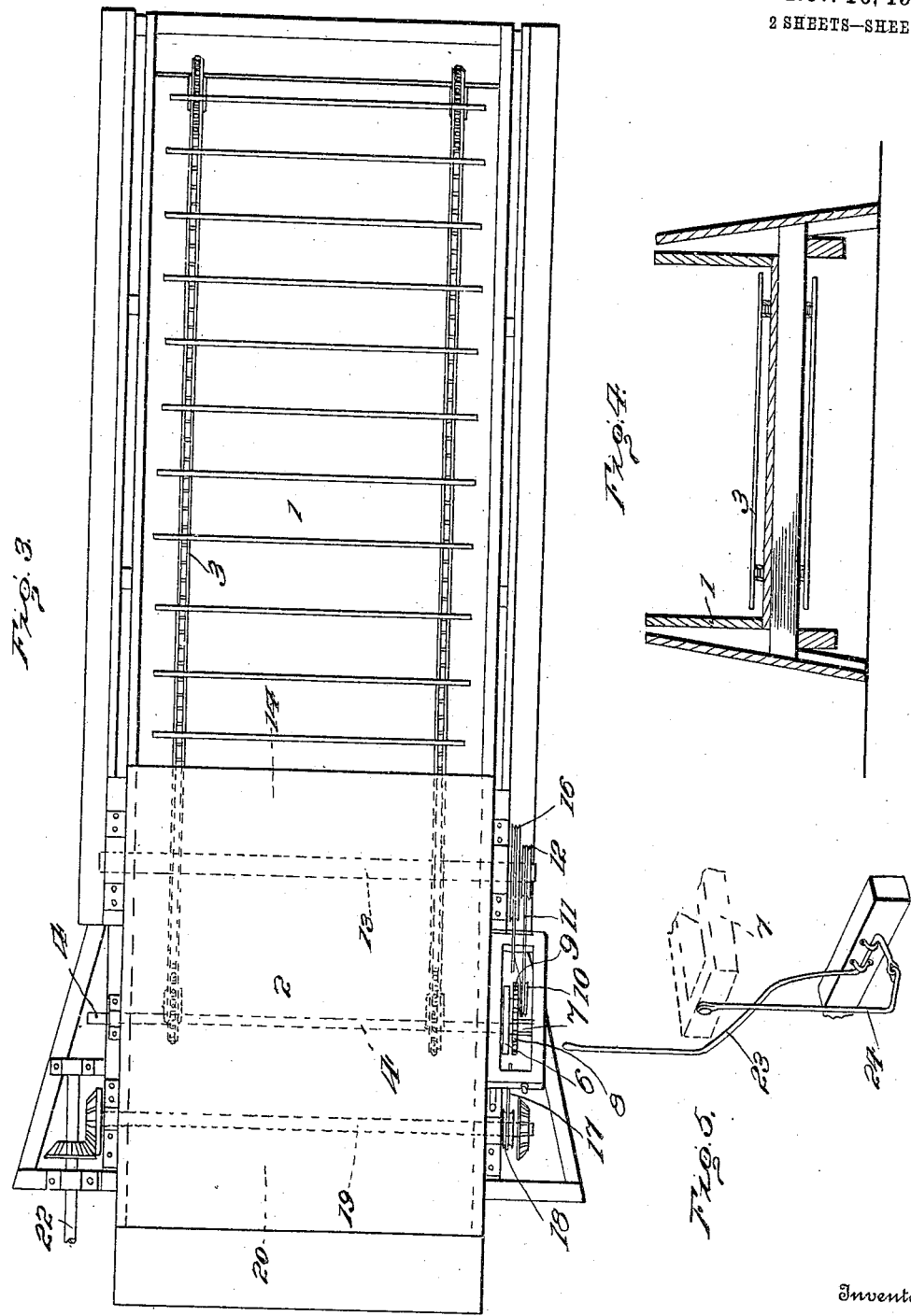

UNITED STATES PATENT OFFICE.

ADOLPH F. JOHNSON AND HENRY C. JOHNSON, OF FOREST, IDAHO.

FEEDER FOR THRESHING-MACHINES.

940,026. Specification of Letters Patent. Patented Nov. 16, 1909.

Application filed July 21, 1908. Serial No. 444,687.

*To all whom it may concern:*

Be it known that we, ADOLPH F. JOHNSON and HENRY C. JOHNSON, citizens of the United States, both residing at Forest, in the county of Nez Perces and State of Idaho, have invented certain new and useful Improvements in Feeders for Threshing-Machines, of which the following is a specification.

This invention has for its object a simple, durable and efficient construction of apparatus for use in connection with a self-feeder of a threshing machine or grain separator and designed to level the headed grain as it passes to the feeder proper, and the invention consists in certain constructions and arrangements of the parts which will be hereinafter fully described and claimed.

For a full understanding of the invention, reference is to be had to the following description and accompanying drawings, in which:

Figure 1 is a side elevation of the leveling apparatus; Fig. 2 is a longitudinal sectional view thereof; Fig. 3 is a top plan view; Fig. 4 is a transverse sectional view, the section being taken through the trough; and, Fig. 5 is a detail perspective view of the hand lever and frame for controlling the operation of the endless conveyer.

Corresponding and like parts are referred to in the following description and indicated in all the views of the drawings by the same reference characters.

The improved apparatus for raking and separating the grain comprises a horizontally extending trough 1 at one end of which a casing or hood 2 is mounted. An endless conveyer 3 travels over the bed of the trough 1 toward the casing 2 and the driven shaft 4 of said conveyer carries a friction disk 5 designed to be frictionally engaged by a spool 6. This spool is journaled in the vertically movable frame 7 which is pivotally secured to one side of the casing as by a link 7ª as shown. The spool 6 is mounted on the same shaft with a gear wheel 8, said spool and gear wheel being connected together in any desired way for simultaneous movement. The gear wheel 8 meshes with a pinion 9 mounted on the same shaft with a pulley 10 and secured thereto in any desired way and said pulley is connected by means of a belt 11 with a pulley 12 secured on one end of a shaft 13. This shaft is journaled in and extends across the casing 2 near the entrance end thereof and carries a leveling drum 14 which is provided on its periphery with a plurality of teeth 15. It is to be particularly noted that the teeth 15 are bent rearwardly, as indicated at 15ª, so as to retard the movement of the on-coming grain carried into the casing by the conveyer 3 and hold the same down or level it so as to maintain the proper uniform depth of feed. The arrow in the drawings shows in which direction the drum 14 turns in the operation of the apparatus, namely in a direction reverse to the direction of movement of the upper stretch of the conveyer. The shaft 13 also carries a band wheel 16 which is operatively connected by means of a driving band 17 with a pulley 18 on the shaft 19. This shaft 19 extends across the lower and rear side of the casing 2, and is journaled therein, preferably on a level with the bed of the trough 1 and in proper spaced relation thereto.

A feed drum 20 is carried by the drive shaft 19 of the apparatus, and said feed drum is provided with a plurality of preferably straight teeth 21, designed to pick up the grain as it is fed thereto by means of the conveyer, and in the proper elevated condition by means of the drum 14 and to throw it into the juxtaposed end of the main feeder, which latter will convey it to the thresher or separator.

The shaft 19 may be driven from the separator in any desired way, as by the stub shaft 22 having bevel pinion engagement with the shaft 19 and designed to be connected to the driving mechanism of the threshing machine by means of a tumbling rod or other driving gear (not shown).

By means of the pivoted frame 7 carrying the friction spool 6, it is obvious that said frame may be raised and lowered so as to stop or start the conveyer 3 when desired to drive it at the proper speed, said frame in the present instance being actuated by means of a bell crank hand lever 23 having a link connection 24 with the frame and fulcrumed on one of the cross bars of the main supporting framework, as clearly illustrated in the drawings.

From the foregoing description in connection with the accompanying drawings, it will be seen that this invention provides means for feeding and leveling grain as it passes to the main feeder of the threshing machine, the grain being forked or dumped in any desired way into the trough 1 and being fed to the leveling drum 14, which latter will properly level the incoming grain as it passes to the feed drum and said feed drum will pitch the grain properly to the main feeder.

As best illustrated in Fig. 2 we hinge a presser board 50 between the drums 14 and 20, the presser board being hinged at its upper edge and being free to swing rearwardly. The lower edge of the presser board 50 is designed to rest upon the grain as it is fed inwardly, and its object is to prevent the smaller drum 20 from jerking off bunches of the grain.

Having thus described the invention, what is claimed as new is:

1. An apparatus of the character described, comprising a trough, an endless conveyer mounted to run in said trough, a casing secured at one end of the trough, a leveling drum journaled in said casing above the conveyer, a feeding drum journaled in said casing level with one end of the conveyer, means for actuating the conveyer and feeding drum, means for turning the leveling drum in a direction reverse to the movement of the upper stretch of the conveyer, and a presser board hinged in the casing between the two drums, and designed to rest upon the grain as it is passed to the feeding drum.

2. An apparatus of the character described, comprising a trough, an endless conveyer mounted to run over the bed of the trough, a casing secured to the trough at one end thereof, a leveling drum journaled in said casing above the conveyer and provided with a plurality of teeth, a feed drum journaled in said casing at the rear of the leveling drum and below the same, said feed drum being also located at the rear of the conveyer and level with one end thereof, the feed drum being also provided with a plurality of teeth, means for rotating said drum, and a presser board hinged in the casing between the two drums and designed to rest on the grain as it is passed to the feed drum.

In testimony whereof we affix our signatures in presence of two witnesses.

ADOLPH F. JOHNSON. [L. s.]
HENRY C. JOHNSON. [L. s.]

Witnesses:
R. H. WALLACE,
W. L. LYON.